May 10, 1932. H. R. METZ 1,857,208
CHAMFERING TOOL AND HOLDER
Filed March 15, 1930
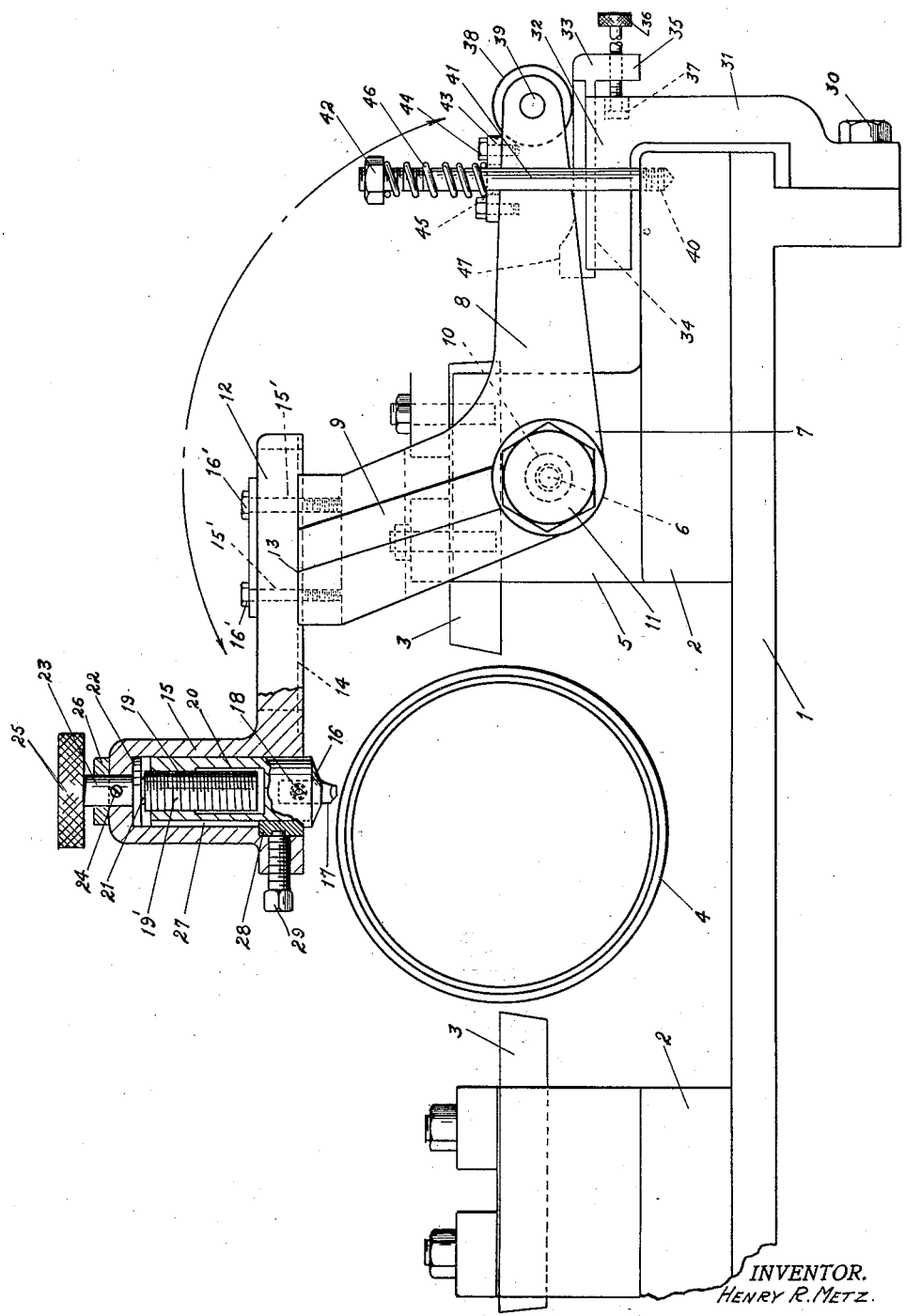
INVENTOR.
HENRY R. METZ.
BY Philip S. Hopkins
ATTORNEY.

Patented May 10, 1932

1,857,208

UNITED STATES PATENT OFFICE

HENRY R. METZ, OF ERIE, PENNSYLVANIA, ASSIGNOR TO WILLIAMS TOOL CORPORATION, OF ERIE, PENNSYLVANIA, A CORPORATION

CHAMFERING TOOL AND HOLDER

Application filed March 15, 1930. Serial No. 436,030.

My invention relates to a chamfering tool for use on a pipe or bolt threading machine, lathe or the like.

As is well known, when a length of pipe or shafting in a threading or similar machine is cut off there remains a burr on the end of the pipe in the machine. Accordingly, a chamfering tool is applied to this end to remove the burr and smooth the end.

It is a principal object of this invention to provide a chamfering device on the carriage block of the cutting off tools that will automatically be brought into use immediately after the cutting off operation, thus saving the time and duplication of parts by the use of a separate carriage and operating means for the chamfering tool and holder.

A further object is to provide a holder of sturdy construction, but permitting of adjustability for the accurate timing of the chamfering operation and of the position of the holder and tool to accommodate the variation in size of the stock.

A preferred embodiment of my invention embracing the above and such other objects as may hereinafter appear is set forth in the following description, reference being had to the accompanying drawing forming a part of the application and wherein like reference numerals indicate like parts.

In the drawing:—

The figure is a side elevation of my device mounted on the carriage block of the machine.

In the drawing, 1 represents the bed of the machine, and 2—2 are carriage blocks operated together by suitable mechanism (not shown) to slide transversely on the bed. The blocks carry tools 3—3 for the purpose of cutting off the pipe or stock 4 after it has been threaded or otherwise machined.

Pivotally mounted as at 6 on a transverse face 5 of one of the blocks 2 is mounted a novel chamfering tool and holder, the subject matter of my invention. The pivoted member is in the form of a bell crank 7 having a horizontally extending arm 8 and a substantially vertical arm 9. The bell crank is mounted on a shaft 10 and is held thereon by the end nut 11. At the upper end of the arm 9 is a bracket 12 of an inverted-dipper shape slidably and horizontally mounted by its handle end thereon as by a tongue and groove arrangement 13 and 14. To provide for the longitudinal movement of the bracket 14, studs 15' having nuts 16' at their upper ends are screwed into the arm 9 and engage in slots (not shown) in the bracket 12. At the other inner end of the bracket is formed an inverted dipper or hollow cylindrical portion 15. Slidably mounted in the dipper is a tool barrel 16 having a chamfering tool 17 secured thereto by a screw at 18. The barrel has a central bore 19 threaded at its upper or outer end and countersunk or enlarged at its inner or lower end at 20 to permit the vertical adjustment of the screw 19', threaded in the barrel bore. The screw 19' has an upper reduced portion 21 carrying a collar 22 fitting snugly in the upper end of the bore of the dipper portion 15. A sleeve 23 is secured by screw 24 to the outer upper end of the portion 21 of screw 19', and is revolubly mounted in the upper end wall of the dipper. A collar 26 is loosely carried on the sleeve 23 to permit of a limited slidable vertical adjustment of the barrel assembly without turning the knob 25.

Along one side of the barrel 16 a longitudinal keyway 27 is cut. A key block 28 is fitted in a depression formed in the dipper 15 adjacent the lower opening thereof and engages in the keyway. A horizontal screw 29 in the lower end of the dipper bears endwise against the key 28 to lock the tool holder barrel after adjustment.

Secured to the bed 1 on the machine at 30 is the right angular bracket 31, having an inwardly extending arm 32. Slidably mounted along the upper face of the arm 32, as in a trackway 34 therein, is a cam 33 having a downturned lip 35, and carrying a screw 36 threaded therein and bearing in a socket 37 in the bracket 31.

At the outer free end of the horizontal arm 8 of the bell crank 7 is a roller 38 mounted on the arm at 39, and adapted to engage the cam 33.

Secured to the block 2 which carries the chamfering tool holder are two spaced parallel upright posts 41, one on each side of the bell crank arm 8, one only being shown in the drawing. At the upper end of each upright a nut 42 is threaded. On the upper end of the arm 8 is a bar 43 secured by screws as at 44 and slidably mounted on the uprights as by the openings 45 in the bar. Freely mounted on the upper ends of each upright between the bar and nut 42 is a spring, whereby the roller 38 is always held in contact with the cam 33.

From the foregoing, it will be seen that as the blocks 2 move inwardly, the roller 38, riding on cam 33 and reaching the raised portion 47 at a predetermined point in its travel, will cause the bell crank 7 to rock on its pivot and lower the chamfering tool 17 into operating engagement with the pipe 4. When the chamfering has been completed, the blocks 2 are backed away from the work and the roller 38, following the cam surface of 33 under influence of spring 46, again rocks the bell crank 8 on its pivot to withdraw the chamfering tool 17 from the work.

The vertical threaded adjustment of the tool 17, provided by the screw 19′ is utilized for compensating for slightly varying sizes in work and for wearing of the tool 17.

It will be seen that I have thus provided a chamfering tool operable automatically to function immediately following the cutting off operation and requiring no independent actuation other than preliminary setting or adjustment, amply provided for.

Of course, changes may be made in details of construction and arrangement of parts without departing from the spirit and scope of my invention. I do not limit myself therefore, other than by the appended claims.

I claim:

1. In combination, a tool carrying block, an auxiliary tool holder comprising a bell crank pivotally mounted on said block, a bracket slidably mounted on one end of the bell crank, a tool carrying barrel slidably mounted in the bracket, means to adjust the position of the barrel, a lock on the bracket to hold the barrel in position, and means at the other end of the bell crank operable by movement of the block to bring the tool into operative position.

2. In combination, a machine having a tool carriage, an auxiliary tool holder including a lever medially pivoted to the carriage, means at one end of the lever providing a horizontal and vertical adjustment of the holder, a bracket arm secured to the bed of the machine, a cam mounted for transverse adjustment on the arm, and a roller on the other end of the lever adapted to ride on the cam to bring the auxiliary tool into cutting position with the operation of the carriage, and spring means on the carriage adapted to hold the roller in contact with the cam.

3. In combination, a machine having a tool carriage, an auxiliary tool holder including a lever pivoted medially to the carriage having an upwardly extending arm and an outwardly horizontally extending arm, means on the upward arm providing for horizontal and vertical adjustment of the tool, a roller on the free end of the horizontal arm, a cam mounted for transverse adjustment on the machine bed, upright posts secured to the carriage, a longitudinal bar resting on the upper edge of the horizontal arm and slidably mounted on the posts, nuts threaded on the upper ends of the posts, and springs on the posts extending between the nuts and bar, whereby the roller is held in contact with the cam as the lever travels with the carriage to bring the auxiliary tool into operation.

4. In combinaiton, a machine having a tool carriage, a rocker arm pivoted on said carriage to swing vertically, an auxiliary tool holder for a ream or chamfering tool mounted on the upright arm of the rocker, means providing for horizontal and vertical adjustment of said holder, a roller on the horizontal arm, a bracket secured to the machine bed, said bracket having a horizontal arm extending inwardly over the tool carriage, a cam having a downturned lip slidably mounted on the horizontal bracket arm, a screw threaded in said lip and bearing against the bracket whereby the cam may be adjusted, upright rods mounted on the carriage, a longitudinal bar secured to the upper edges of the horizontal rocker arm, and slidably mounted on the rods, springs on the rods bearing against the bar, and nuts on the upper ends of the rods compressing the springs against the bar, whereby the roller is held in contact against the cam and the reamer is brought into cutting position with the operation of the carriage.

5. A cutting off tool including a holder slidable toward and away from the work, a chamfering tool and holder pivoted on said first holder for independent movement toward and away from the work, and means on said chamfering tool holder cooperating with a fixed member for automatically actuating said chamfering tool upon movement of said cutting off tool.

6. A cutting off tool including a holder slidable toward and away from the work, a chamfering tool and holder pivoted for independent movement toward and away from the work, and means on said second holder cooperating with a fixed member for automatically actuating said chamfering tool upon movement of said cutting off tool, and means for adjusting the position of said fixed member for predetermining the time of actuation of said chamfering tool.

In testimony whereof, I affix my signature.

HENRY R. METZ.